United States Patent
Klug et al.

(10) Patent No.: US 8,700,712 B2
(45) Date of Patent: Apr. 15, 2014

(54) PROVISION OF PRESENCE DATA ALLOCATED TO THE USER OF A COMMUNICATION SERVICE

(75) Inventors: Karl Klug, Miesbach (DE); Thomas Lederer, Herrsching (DE); Harald Müller, Gilching (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1503 days.

(21) Appl. No.: 10/570,005

(22) PCT Filed: Aug. 23, 2004

(86) PCT No.: PCT/EP2004/051878
§ 371 (c)(1), (2), (4) Date: Feb. 28, 2006

(87) PCT Pub. No.: WO2005/025157
PCT Pub. Date: Mar. 17, 2005

(65) Prior Publication Data
US 2007/0022161 A1    Jan. 25, 2007

(30) Foreign Application Priority Data
Aug. 29, 2003   (DE) .................................. 103 40 384

(51) Int. Cl.
*G06F 15/16* (2006.01)
(52) U.S. Cl.
USPC ......................................................... 709/206
(58) Field of Classification Search
USPC ......................................................... 709/206
See application file for complete search history.

(56) References Cited

U.S. PATENT DOCUMENTS

| 7,120,455 | B1 * | 10/2006 | Chen et al. ..................... 455/466 |
| 2002/0078150 | A1 * | 6/2002 | Thompson et al. ........... 709/204 |
| 2002/0083136 | A1 | 6/2002 | Whitten, II |
| 2003/0065721 | A1 | 4/2003 | Roskind |
| 2003/0130014 | A1 | 7/2003 | Rucinski |
| 2003/0229687 | A1 * | 12/2003 | Ohno et al. .................... 709/220 |
| 2005/0071426 | A1 * | 3/2005 | Shah .............................. 709/204 |
| 2005/0210104 | A1 * | 9/2005 | Torvinen ....................... 709/205 |
| 2008/0046510 | A1 * | 2/2008 | Beauchamp et al. ......... 709/204 |

FOREIGN PATENT DOCUMENTS

| WO | WO 99/34628 A1 | 7/1999 |
| WO | WO 02/43351 A2 | 5/2002 |
| WO | WO 03/030003 A1 | 4/2003 |
| WO | WO 03/065701 A1 | 8/2003 |

OTHER PUBLICATIONS

Vogiazou, Y.: Wireless Presence and Instant Messaging. KMI, The Open University, 2002 www.jisc.ac.uk/upload_documents/tsw_02-07.pdf.

* cited by examiner

*Primary Examiner* — Ryan Jakovac
(74) *Attorney, Agent, or Firm* — Buchanan Ingersoll & Rooney PC

(57) ABSTRACT

Data characterizing the presence state of a user registered to use a communication service is sent to a server for the management of presence data in order to provide presence data allocated to the user of a communication service. The data sent to the server is stored as presence data allocated to the user and is made available for predefinable first users. The user is provided with presence data allocated to predefinable second users. The predefinable first and second users are determined by means of an activated service profile allocated to the user.

7 Claims, 4 Drawing Sheets

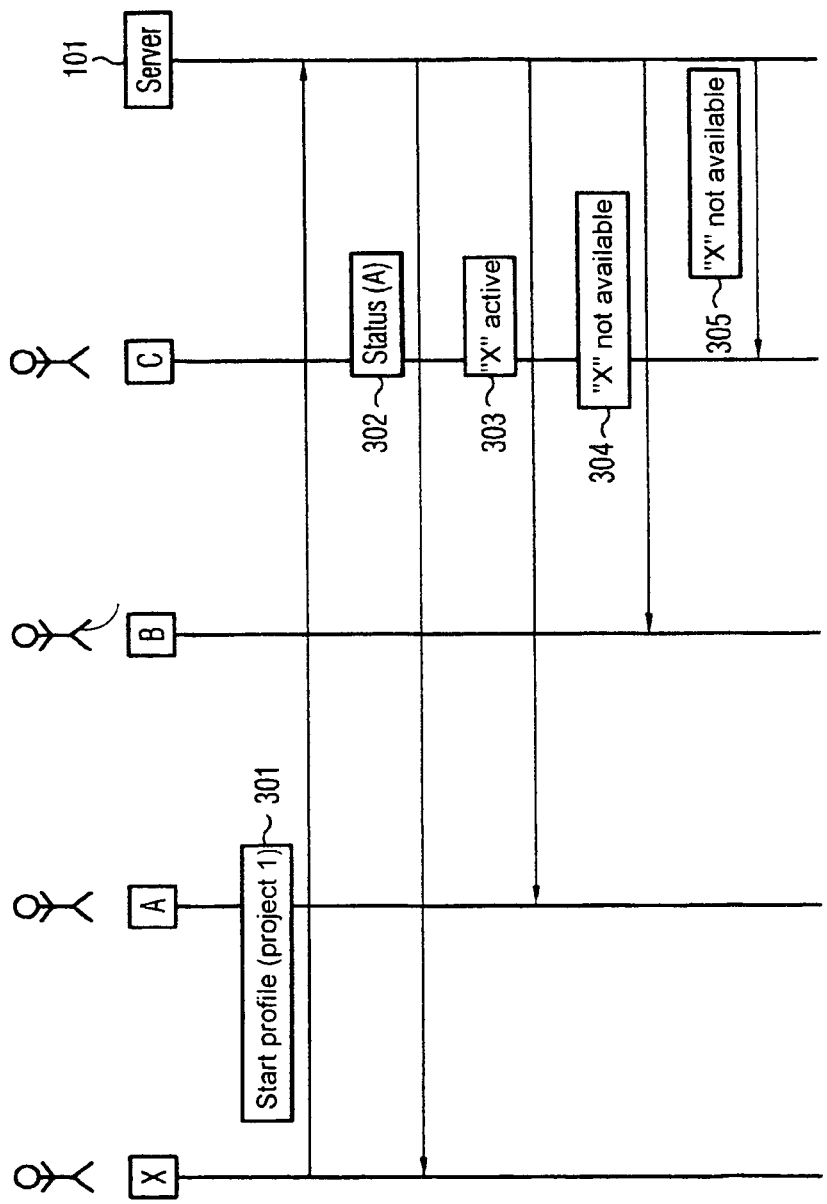

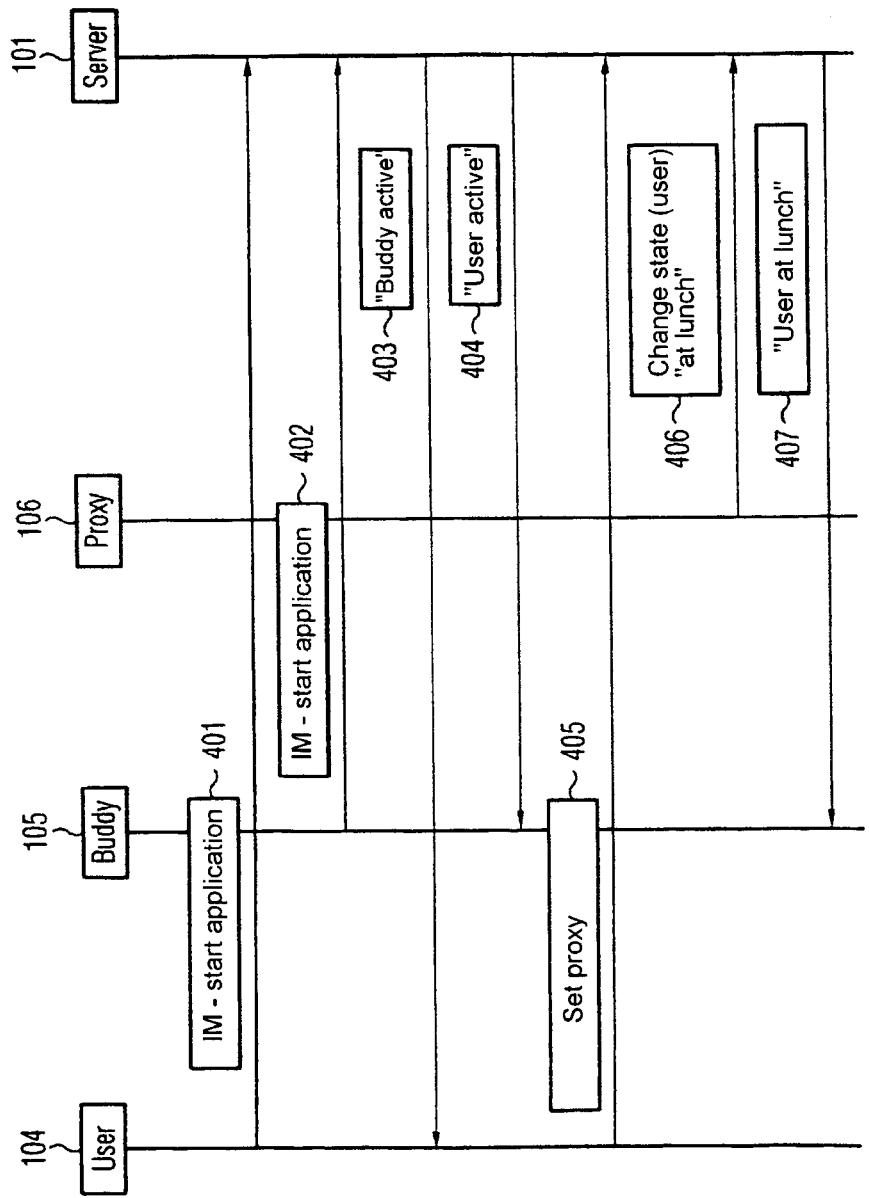

PROVISION OF PRESENCE DATA ALLOCATED TO THE USER OF A COMMUNICATION SERVICE

CROSS REFERENCE TO RELATED APPLICATIONS

This application is the US National Stage of International Application No. PCT/EP2004/051878, filed Aug. 23, 2004 and claims the benefit thereof. The International Application claims the benefits of German application No. 10340384.1 DE filed Aug. 29, 2003, both of the applications are incorporated by reference herein in their entirety.

FIELD OF INVENTION

The present invention relates to a method for provision of presence information allocated to a user of a communication service, to a communication system and to a control program.

BACKGROUND OF INVENTION

Internet-based instant messaging applications for exchanging information within selected user groups without the time delays known from conventional e-mail applications are enjoying growing popularity. Typical instant messaging applications allow a user to prepare a message to members of a selected user group, also referred to as a "buddy list", and to send the message for essentially immediate receipt. In the opposite direction the user similarly receives messages from members of the selected user group.

It is known from 02/43351 that in a communication system a first server is provided for provision of program applications and for data exchange with a first client and a second server for receiving and administering the presence information which is allocated to the first client. Presence information indicates whether a user is currently accessible at a specific terminal in the communication system. The first server is also provided for exchange of data with a second client based on the presence information allocated to the first client.

In the communication system described in 02/43351, the presence information can additionally be combined with a program application. If a user accesses a program application via a terminal for example, the program application allocates the presence information "active" to the user and monitors activities of the user at the terminal. If no user activities are able to be detected for a specific period, the program application causes a check message to be transferred to the terminal. If the user acknowledged the check message at the terminal, the presence information "active" continues to be allocated to the user. Otherwise the user is allocated the presence information "inactive" or a corresponding suitable value. The presence information allocated to the user can also affect the delivery of messages to other users. Such a message is only delivered for example if the presence information "active" is actually allocated to the user. Otherwise the message is deleted or is forwarded to another destination indicated by the presence information.

Instant messaging systems basically require a potential addressee of a message to be accessible. Unlike e-mail systems in which delays in message transmission and in response to messages are the norm, with instant messaging systems sending a message to a first addressee who does not receive the message until hours or days later is generally undesirable. This is why precautions for determining precise presence information allocated to users in a communication system become highly significant.

For convenient administration of "buddy lists" the members of a selected user group can be subdivided into groups in order to improve clarity. A further convenience feature is blocking lists which make it possible for a user to prevent other predefinable users from seeing presence information allocated to him. Alternatively it is possible for these predefinable users to be signaled the presence information "absent" for example, to indicate that the user is not available for the predefinable further users.

SUMMARY OF INVENTION

An object of the present invention is thus to specify an efficient method for provision of presence information allocated to a user of a communication service as well as a suitable means for carrying out the method.

In accordance with the invention this object is achieved by a method, a communication system and a control program with features specified in the independent claims. Advantageous developments of the present invention are specified in the dependent claims.

An important aspect of the present invention lies in the fact that a predefinable first and second user are determined on the basis of an activated service profile which is allocated to a user registered to use a communication service. Information designating the presence state of the user is transferred to a server for administration of presence information. The information transferred to the server is stored there as presence information and made available to the predefinable further users. Presence information which is allocated to the predefinable users is in turn made available to the user. The determination of the predefinable first and second user on the basis of a service profile opens up to the user the option of being able, explicitly and depending on the relevant application context, to exert influence on a distribution of the presence information allocated to him. As well as more effective handling as a result of greater user friendliness, this provides the advantage of reduced network traffic since an unnecessary transfer of presence information to undesired destinations is suppressed right from the start through explicit control.

In accordance with an advantageous embodiment of the present invention the communication service is an instant messaging service. This allows realtime communication or communication almost in realtime Advantageously the presence information for the predefinable first or second user can be provided so that it can be retrieved by a multicast message to the predefinable further users. This makes possible simple transfer or distribution of the presence information.

In accordance with a further advantageous embodiment, on release of the user registered to use the communication service, a selected further selected user is granted an authorization to change presence information. Introducing a proxy-like authorization to change the presence information for a user produces benefits as regards rapid and precise recording and provision of the presence information which is thus no longer exclusively the responsibility of the user.

BRIEF DESCRIPTION OF THE DRAWINGS

The present invention will be explained below in greater detail by an exemplary embodiment which refers to the drawing. The drawings show FIG. 1 an application environment of the present invention with a server for provision of an instant messaging service and for administration of presence information, and with a number of clients for using the instant messaging service, FIG. 2 a graphical overview with a typical diagram of configured service profiles, FIG. 3 a diagram for exchange of messages between the clients and the server on provision of presence information.

FIG. 4 a diagram showing exchange of messages between the clients and the server when an instant messaging application is started and when presence information is changed.

DETAILED DESCRIPTION OF INVENTION

Figure 1:
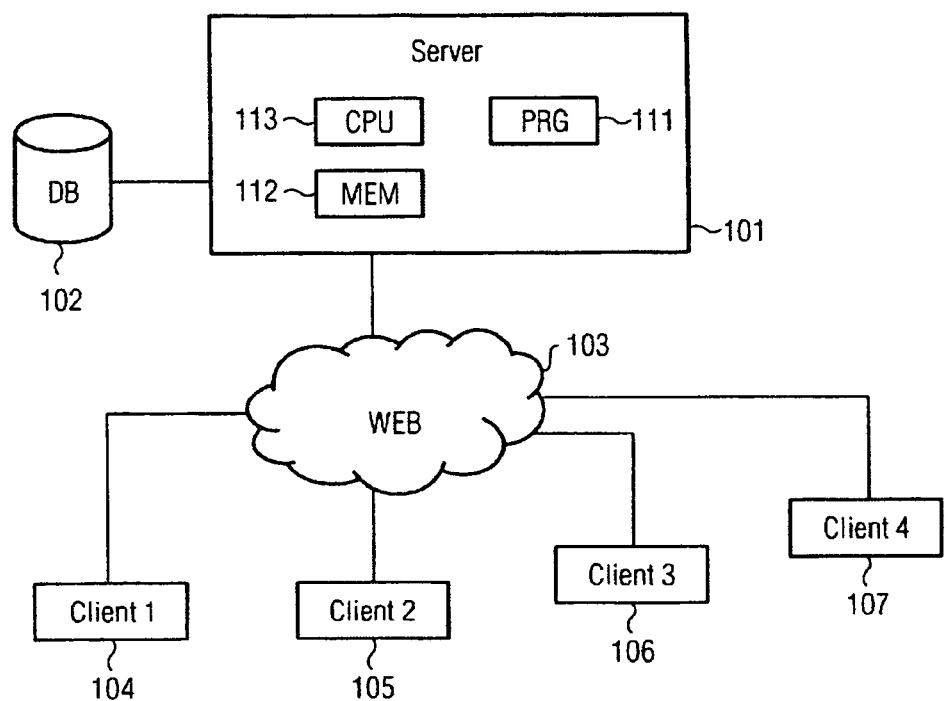

The application environment shown in FIG. 1 comprises a server 101, through which the instant messaging service is provided for use by a number of clients 104 to 107. The clients 104 to 107 are connected to the server 101 via a data network 103, for example the Internet. Realtime communication connections are established by the instant messaging, service via the server 101, between clients at which a relevant user has started an instant messaging application. The server 101 in this case is particularly responsible for the task of monitoring the communication connections between the clients 104 to 107. This also includes for example monitoring the bandwidth necessary for the provision of the instant messaging service and the quality of service.

As well as the provision of the instant messaging service, the server 101 is given the task of administering presence information for users of the instant messaging service. Advantageously this type of presence information is recorded at the start of an instant messaging application at one of the clients 104 to 107 by the server 101 as a reaction to a request from the user for provision of an instant messaging application. A database 102 assigned to the server 101 is provided for storage of the presence information. In addition the server 101 handles the task of transferring to predefinable first users the presence information for a user who is currently using an instant messaging service. The predefinable further users can for example be members of a configured user group. This user group can also be defined negatively in the form of a "blocking list" and comprise users to which no presence information will be transferred. In addition information is made available to the user by the server 101 about predefinable second users, for example for members of a "buddy list".

Presence information can be transferred to the predefinable further users for example by means of a multicast message. As an alternative to this it is possible to make the presence information for users retrievable such that only the relevant users are authorized to interrogate presence information. In addition the server 101 is intended for granting an authorization for changing the presence information allocated to a user to a further selected user, for example a proxy. A requirement is that the user involved has been enabled to do so.

To provide the user with the opportunity explicitly and dependent on the relevant application context to exert influence on the presence information allocated to him, the predefinable first and second users are determined on the basis of a service profile. The service profile is allocated to the user, can be configured individually by him and is also configured by the server 101. Simultaneous activation of a number of service profiles is entirely possible. In any event rules for exception handling should be defined in this case, in order to exclude possible conflicts if service profiles which collide with one another are used.

To look after the tasks described a control program 111 is installed on the server 101 which can be loaded into the main memory 112 of the server 101 and of which the code sections can be executed by a processor 113 of the server 101. On execution of the control program 111 a transfer of information which identifies the presence state of a user registered to use the instant messaging service is initiated to the server 101 for administration of presence information. Furthermore, on execution of the control program 111, the information transferred to the server 101 is stored as the presence information allocated to the user and made available for predefinable first users. In addition presence information allocated to predefinable second users is made available to the user. The predefinable first and second users are determined on the basis of an activated service profile allocated to the user. These steps are executed if the control program 111 is running on the server 101.

Figure 2:
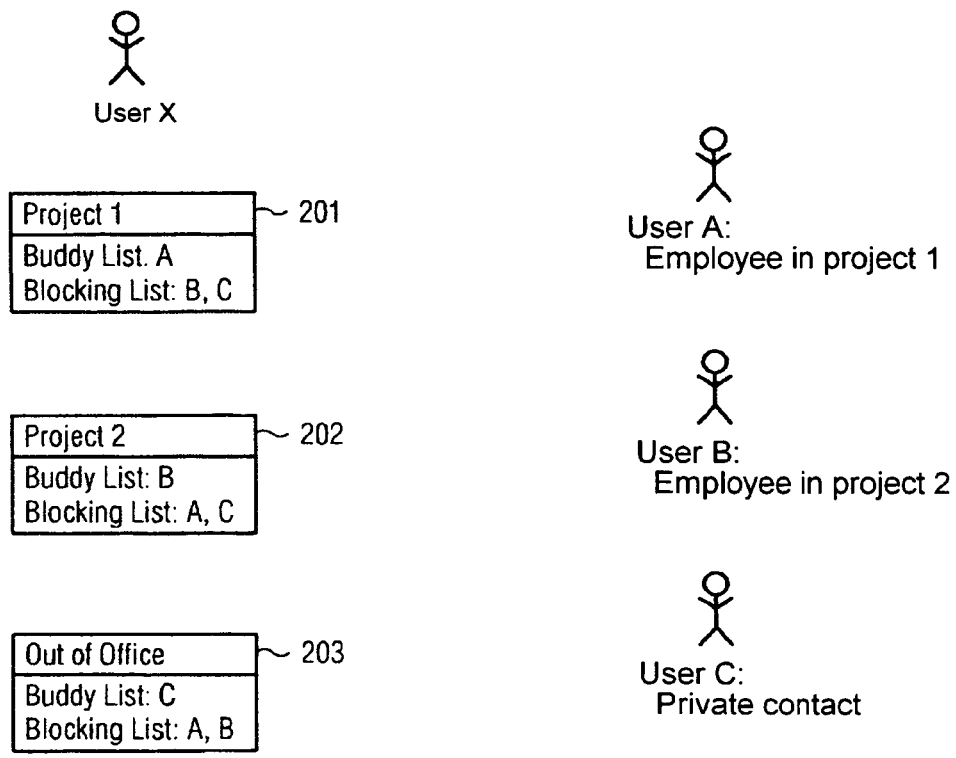

FIG. 2 shows typical configured service profiles 201 to 203 of user X and of further users A to C included in service profiles 201 to 203, with their relevant relationship to user X. User X as well as A to C can each use any client 104 to 107. A first service profile 201 of user X is defined for working in "project 1". User A, who is also working in "project 1" is listed in a "buddy list" for first service profile 201. The first service profile 201 has been created with the aim of enabling user X to maintain contact solely with members of "project 1" and not be disturbed by other users. For this reason user B, who works in "project 2" and user C, who represents a private contact, i.e. a relation, friend or acquaintance, are entered in the "blocking list" for the first service profile 201.

In addition to his work in "project 1", user X also works in "project 2" as well. For this reason a second service profile 202 is created for user X, based on the same considerations as those applied for creating the first service profile 202. For this season the "buddy list" for the second service profile 202 includes user B, whereas users A and C are entered in the "blocking list".

A third service profile 203 is created for the usage scenario "out of office", in which user X is not available for project-related inquiries as opposed to private contacts. As a result users A and B are entered in the "blocking list" while user C is entered in the "buddy list". Depending on the application context one of the service profiles 201 to 203 or—if sensible—a combination of service profiles can be activated.

FIG. 3 illustrates an exchange of messages between the server 101 and the users X as well as A to C for activating the first service profile 201 which is configured in the context of working in "project 1" by user X. For activating the first service profile 201, user X transfers a message 301 with a corresponding request to server 201. The message 301 is first checked for validity there, especially as to whether a correctly configured, requested profile is present. If the check yields a positive result, the server 101 in accordance with instructions implied by the first service profile 101, first transfers to user X a message 302 with Information about the presence state of user A entered in the "buddy list" to user X. In addition server 101 also transmits to user A a message 303 about the presence state of user X, who is now active and available for user A. Since users B and C are entered in the "blocking list" for "project 1", users B and C each receive a message 304, 305 automatically or only on request from server 101 about the presence state of user X, who is declared in the present example as not available.

The diagram shown in FIG. 4 illustrates an exchange of messages between clients 104 to 107 and server 101 when an instant messaging application is started and when presence information changes. When an instant messaging application is started by a user at a first client 104 a message 401 with a request to start an instant messaging application is transferred to server 101. Server 101 then checks the authorization of the user at the start of an instant messaging application and retrieves a user profile. A configured user group of which the members have granted each other the authorization to make presence information available to the other members of the user group is produced from the user profile.

The remarks made below assume that the user at the first client 104 is the first user within the user group who has started the instant messaging application and to whom the presence information is thus "actively" allocated. For this reason the user at the first client 104 is not yet informed about the presence states of other users within the user group. This only occurs after the start of an instant messaging application of a further member of the user group at a second client 105.

In this case too, at the start of the instant messaging application at the second client 105, a message 402 is also transmitted with a request to start an instant messaging application to the server 101 and subsequently monitored and processed by the server 101. For a successful check of the request by the server 101 the instant messaging application is provided at the second client 105. In addition the user at the first client 104 is informed by means of a message 403 about the new presence state of the further member of the user group. In a similar manner member the further member of the user group at the second client 105 is also informed about the presence state of the user by means of a message 404.

If the user at the first client 104 wishes to delegate the updating of his absence state, to a proxy at a third client 106 for example, the user at the first client 104 sends a message 405 to the server 101 with a request to set a proxy. In this message 405 the proxy at the third client 106 will be identified as the user authorized to change the presence information allocated to the user at the first client 104. On this user release the server 101 grants the proxy at the third client 106 the requested authorization. If for example the presence state of the user at the first client 104 now changes, without this causing the updating of the presence information allocated to him itself, the proxy at the third client 106 can bring this about by means of a message 406 with a request for changing the presence information allocated to the user at the first client 104. If the authorization is available, the server 101 then changes the presence state of the user at the first client 104 and transfers a message 407 about the change of presence state of the user at the first client 104 to the further member of the user group at the second client 105. A typical example application is the updating of presence for a user during a lunch break, by the support staff assigned to the user.

The application of this invention is not restricted to the exemplary embodiment described here.

The invention claimed is:

1. A method for updating presence information in a communication service in which members of a user group are informed of a presence of a member of the user group in a communication session by a message received from a server comprising:
    a first member of the user group notifying the server that the first member is present, thereby prompting the server to provide members of the user group presence information about the first member;
    the first member during the communication session sending a proxy request to the server to enable a second member of the user group to change the presence information about the first member; and
    the server granting the proxy request, thereby enabling the second member of the user group to change the presence information about the first member during the communication session;
    the server receiving a request from a member of the user group other than the first member to change the presence information of the first member;
    the server checking to see if the member making the request to change the presence information of the first user has received a proxy which enables that member of the user group to change the presence information about the first member;
    if the member making the request to change the presence information of the first user has received a proxy which enables that member of the user group to change the presence information about the first member the server changes the presence information about the first member as requested; and
    if the member making the request to change the presence information of the first member has not received a proxy which enables that member of the user group to change the presence information about the first member the server refusing to change the presence information about the first member;
    wherein the proxy enables the second member to change the presence information of the first member only during the communication session in which the proxy was issued.

2. The method according to claim 1, wherein the communication service is an instant messaging service.

3. The method according to claim 1, further comprising the first member providing to the server an activate profile message, the activate profile message identifying a profile which enables a second member of the user group able to receive the presence information of the first member and a third member of the user group unable to receive the presence information of the second member.

4. The method according to claim 3, wherein the presence information of the first member is transmitted to the second member of the user group and is not transmitted to the third member of the user group.

5. The method according to claim 1, wherein the presence information of the first member is transmitted via a multicast message.

6. The method according to claim 1, wherein presence information about the first member is transmitted to a second member of the user group after a request from the second member.

7. The method of claim 1 wherein the proxy enables the second member of a user group to change the presence information about the first member of the user group to indicate that the first member is absent.

* * * * *